US012803347B2

(12) United States Patent
Gerbetz

(10) Patent No.: US 12,803,347 B2
(45) Date of Patent: Nov. 17, 2026

(54) MOTOR AND HOUSING ASSEMBLY

(71) Applicant: Moog Inc., East Aurora, NY (US)

(72) Inventor: Robert P. Gerbetz, Waukegan, IL (US)

(73) Assignee: Moog Inc., East Aurora, NY (US)

( * ) Notice: Subject to any disclaimer, the term of this patent is extended or adjusted under 35 U.S.C. 154(b) by 187 days.

(21) Appl. No.: 18/833,195

(22) PCT Filed: Jan. 27, 2023

(86) PCT No.: PCT/US2023/011753
§ 371 (c)(1),
(2) Date: Jul. 25, 2024

(87) PCT Pub. No.: WO2023/150063
PCT Pub. Date: Aug. 10, 2023

(65) Prior Publication Data

US 2025/0132616 A1 Apr. 24, 2025

Related U.S. Application Data

(60) Provisional application No. 63/306,283, filed on Feb. 3, 2022.

(51) Int. Cl.
*H02K 1/18* (2006.01)
*H02K 1/14* (2006.01)
(Continued)

(52) U.S. Cl.
CPC ............. *H02K 1/185* (2013.01); *H02K 1/145* (2013.01); *H02K 1/20* (2013.01); *H02K 1/278* (2013.01); *H02K 1/30* (2013.01); *H02K 21/145* (2013.01)

(58) Field of Classification Search
CPC .......... H02K 1/18; H02K 1/185; H02K 1/145; H02K 1/20; H02K 1/28; H02K 1/30; H02K 5/04; H02K 5/20
See application file for complete search history.

(56) References Cited

U.S. PATENT DOCUMENTS 3,293,464 A * 12/1966 Spirk ..................... H02K 1/185 310/91
4,060,744 A * 11/1977 Starcevic ................ H02K 5/00 310/91
(Continued)

FOREIGN PATENT DOCUMENTS

CN 207941620 U 10/2018
DE 877347 C 5/1953
(Continued)

OTHER PUBLICATIONS

Jiangsu Shizhan Group Co., Metal Buildings Prefab Steel Semi Circle Roof Truss with Best Design, Webpage (https://shizhangroup.en.made-in-china.com).
(Continued)

*Primary Examiner* — Christopher M Koehler
*Assistant Examiner* — Ahmed F Seck
(74) *Attorney, Agent, or Firm* — Harter Secrest & Emery LLP

(57) ABSTRACT

A motor comprising a stator having electrical windings, a stator frame supporting the stator, a rotor, a rotor frame supporting the rotor, the rotor orientated about a longitudinal axis and mounted for movement about the longitudinal axis relative to the stator, a radial air gap between the stator and the rotor, the stator frame comprising a three dimensional annular open structural framework orientated in a geometric pattern comprising a plurality of stator frame inner members, stator frame outer members and stator frame cross members interconnected at a plurality of stator frame nodes, and the rotor frame comprising a three dimensional annular open structural framework orientated in a geometric pattern comprising a plurality of rotor frame inner members, rotor frame outer members and rotor frame cross members interconnected at a plurality of rotor frame nodes.

13 Claims, 12 Drawing Sheets

(51) Int. Cl.

| | |
|---|---|
| ***H02K 1/20*** | (2006.01) |
| ***H02K 1/278*** | (2022.01) |
| ***H02K 1/30*** | (2006.01) |
| ***H02K 21/14*** | (2006.01) |

(56) References Cited

U.S. PATENT DOCUMENTS

| | | | | |
|---|---|---|---|---|
| 4,922,150 | A * | 5/1990 | Starcevic | H02K 1/30 310/90 |
| 6,789,610 | B1 | 9/2004 | Hegde | |
| 7,740,450 | B2 | 6/2010 | Cairo | |
| 8,182,234 | B2 | 5/2012 | Willey | |
| 8,262,337 | B2 | 9/2012 | Richards | |
| 8,729,721 | B2 | 5/2014 | Borgen et al. | |
| 9,249,777 | B2 | 2/2016 | Khan | |
| 9,261,073 | B2 | 2/2016 | Blak et al. | |
| 9,709,028 | B2 | 7/2017 | Freda | |
| 10,476,358 | B2 | 11/2019 | Huang et al. | |
| 10,714,999 | B2 * | 7/2020 | Gröning | H02K 15/03 |
| 2009/0001842 | A1 | 1/2009 | Custforth et al. | |
| 2015/0176571 | A1 * | 6/2015 | Bustreo | H02K 1/30 29/598 |
| 2019/0329858 | A1 | 10/2019 | Bevirt et al. | |
| 2020/0036243 | A1 * | 1/2020 | Zhao | H02K 1/145 |
| 2020/0161943 | A1 | 5/2020 | Huang et al. | |

FOREIGN PATENT DOCUMENTS

| | | | |
|---|---|---|---|
| DE | 202013010249 | U1 | 12/2014 |
| JP | S61262042 | A | 11/1986 |

OTHER PUBLICATIONS

Truss, FD44 Circle Truss 5m, Webpage (www.trussevent.com/ProductsSt/281.html).

* cited by examiner

MOTOR AND HOUSING ASSEMBLY

TECHNICAL FIELD

The present invention relates generally to electric motors, and more particularly to an electric motor having an improved stator and rotor housing assembly.

BACKGROUND ART

Claw-pole type motors generally comprise a stator having a plurality of circumferentially spaced axially overlapping claw poles, and a rotor having a plurality of permanent magnets arranged along its circumference, wherein the motor rotates the rotor using electromagnetic forces generated between the stator and the rotor. For example, U.S. Patent Publication No. 2009/0001843 entitled "Rotating Electrical Machine" is directed to a motor having a claw-pole stator with a stator core that includes a plurality of claw poles and a stator coil wound inside the stator core, and a rotor rotatably disposed at a position facing opposite the claw poles.

BRIEF SUMMARY

With parenthetical reference to corresponding parts, portions or surfaces of the disclosed embodiment, merely for the purposes of illustration and not by way of limitation, a motor (15) is provided comprising: a stator (30) having electrical windings (33); a stator frame (60) supporting the stator; a rotor (20) having permanent magnets (21); a rotor frame (40) supporting the rotor; the rotor orientated about a longitudinal axis (x-x) and mounted for movement about the longitudinal axis relative to the stator; a radial air gap (16) between the stator and the rotor; the stator frame comprising a three dimensional annular open structural framework orientated in a geometric pattern comprising a plurality of stator frame inner members (64, 65), stator frame outer members (61, 62), and stator frame cross members (68) interconnected at a plurality of stator frame nodes (70, 71); and the rotor frame comprising a three dimensional annular open structural framework orientated in a geometric pattern comprising a plurality of rotor frame inner members (44, 45), rotor frame outer members (41, 42), and rotor frame cross members (48) interconnected at a plurality of rotor frame nodes (50, 51).

The stator frame inner members may comprise a plurality of axially extending members (65) and a plurality of circumferentially extending members (64) interconnected at a plurality of inner nodes (71); the stator frame outer members may comprise a plurality of axially extending members (62) and a plurality of circumferentially extending members (61) interconnected at a plurality of outer nodes (70); and the stator frame cross members may comprise a plurality of radial and diagonally extending members (68) interconnected to the stator frame inner members at the plurality of inner nodes and interconnected to the stator frame outer members at the plurality of outer nodes. The stator frame circumferentially extending members and the stator frame cross members may define a triangular geometric pattern. The stator frame inner members, stator frame outer members and stator frame cross members may define a tetrahedral geometric ring pattern or a half-octahedral geometric ring pattern.

The stator frame inner members, stator frame outer members and stator frame cross members may comprise interior stator frame member flow passages (81, 81*a*); the stator frame nodes may comprise interior stator frame node flow junctions (82, 82*a*, 82*b*, 82*c*); and the stator frame member flow passages and the stator frame node flow junctions may be connected to form a stator frame fluid passage (80) for cooling the motor.

The motor may comprise a stator fluid inlet (86) communicating with the stator frame fluid passage and a stator fluid outlet (87) communicating with the stator frame fluid passage. The motor may comprise a stator fluid manifold (85) communicating with the stator frame fluid passage, the stator fluid inlet and the stator frame fluid outlet. The motor may comprise a bearing (24) between the stator fluid manifold and the rotor frame.

The rotor frame inner members may comprise a plurality of axially extending members (45) and a plurality of circumferentially extending members (44) interconnected at a plurality of inner nodes (51); the rotor frame outer members may comprise a plurality of axially extending members (42) and a plurality of circumferentially extending members (41) interconnected at a plurality of outer nodes (50); and the rotor frame cross members may comprise a plurality of radial and diagonally extending members (48) interconnected to the rotor frame inner members at the plurality of inner nodes and interconnected to the rotor frame outer members at the plurality of outer nodes. The rotor frame circumferentially extending members and the rotor frame cross members may define a triangular geometric pattern. The rotor frame inner members, rotor frame outer members and rotor frame cross members may define a tetrahedral geometric ring pattern or a half-octahedral geometric ring pattern. The motor may comprise an outer stator frame shell (18).

The stator may comprise a first stator portion (32*a*) having a plurality of first stator teeth (35) orientated radially about the longitudinal axis and extending axially in a first direction and a second stator portion (32*b*) having a plurality of second stator teeth (36) orientated radially about the longitudinal axis and extending axially in a second direction opposite to the first direction; the first stator portion and the second stator portion may define a first stator gap (37) orientated about the longitudinal axis and extending axially between the first stator portion and the second stator portion and about the longitudinal axis; at least a portion of the plurality of first stator teeth may extend axially in the first direction beyond at least a portion of the plurality of second stator teeth that extend axially in the second direction, to form a second stator gap orientated about the longitudinal axis and extending both axially and radially between the plurality of first stator teeth of the first stator portion and the plurality of second stator teeth of the second stator portion and about the longitudinal axis; and the electrical windings may comprise first electromagnetic windings (33) disposed in the first gap (37) between the first stator portion and the second stator portion and configured to be selectively energized to exert a torque on the rotor.

The stator may comprises a third stator portion having a plurality of third stator teeth orientated radially about the longitudinal axis and extending axially in the first direction and a fourth stator portion having a plurality of fourth stator teeth orientated radially about the longitudinal axis and extending axially in the second direction (31B); the third stator portion and the fourth stator portion may define a second stator gap orientated about the longitudinal axis and extending axially between the third stator portion and the fourth stator portion and about the longitudinal axis; and the electrical windings may comprise second electromagnetic windings disposed in the second gap between the third stator portion and the fourth stator portion and configured to be selectively energized to exert a torque on the rotor. The first stator portion, the second stator portion, the third stator portion and the fourth stator portion may be spaced axially along the longitudinal axis and may be radially aligned relative to the longitudinal axis. The first electromagnetic windings may form a first annular coil and the second electromagnetic windings may form a second annular coil.

DETAILED DESCRIPTION OF THE EMBODIMENTS

Figure 1:
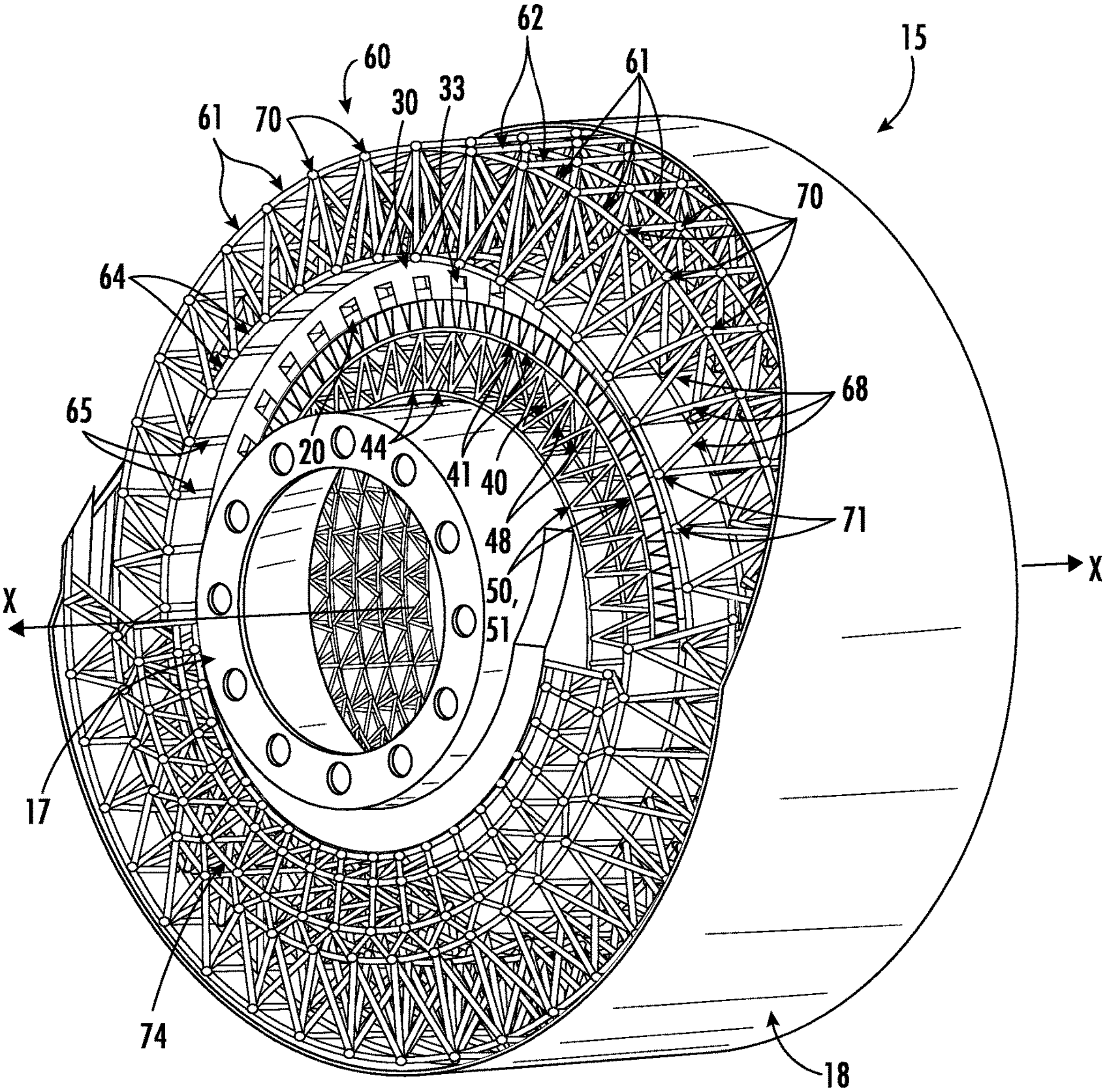
FIG. 1 is a partial cutaway perspective view of a first embodiment of a motor having an improved rotor and stator assembly.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms “horizontal”, “vertical”, “left”, “right”, “up” and “down”, as well as adjectival and adverbial derivatives thereof (e.g., “horizontally”, “rightwardly”, “upwardly”, etc.), simply refer to the orientation of the illustrated structure as the particular drawing figure faces the reader. Similarly, the terms “inwardly” and “outwardly” generally refer to the orientation of a surface relative to its axis of elongation, or axis of rotation, as appropriate.

Referring now to the drawings, and more particularly to FIGS. 1-13 thereof, a motor assembly is provided, of which a first embodiment is generally indicated at 15. As shown, motor 15 generally comprises stator 30 having electrical windings 33, outer stator frame 60 supporting stator 30, rotor 20 having outer circumferentially spaced permanent magnets 21 and flux concentrators 22, and inner rotor frame 40 supporting rotor 20. Rotor 20 is operationally configured to rotate about longitudinal axis x-x relative to stator 30. Rotor 20 and stator 30 are separated by radial air gap 16 therebetween.

Figure 4:
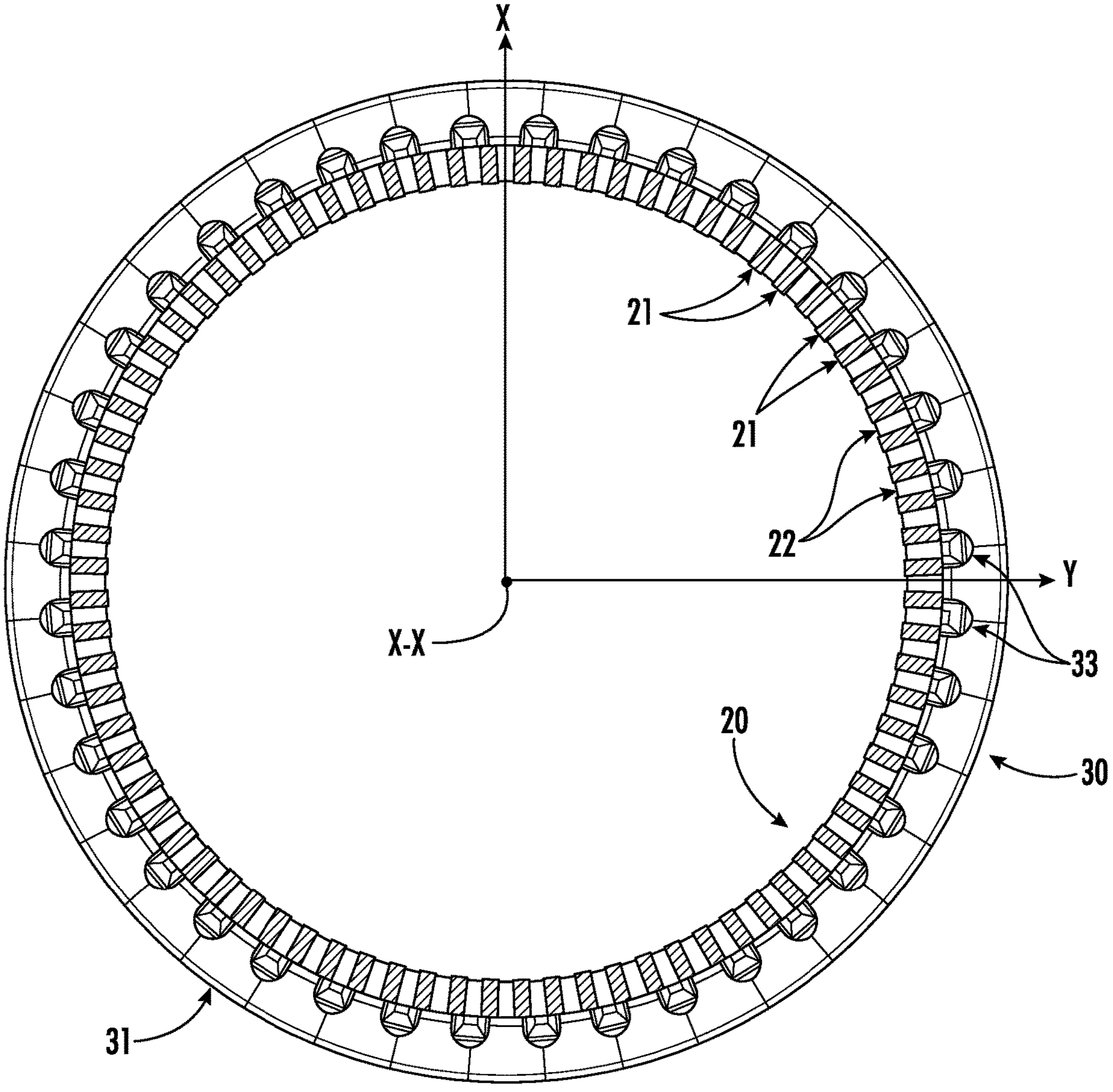
FIG. 4 is an end view of an embodiment of the rotor and stator shown in FIG. 3, showing a three ring or phase rotor and stator assembly.
Figure 5:
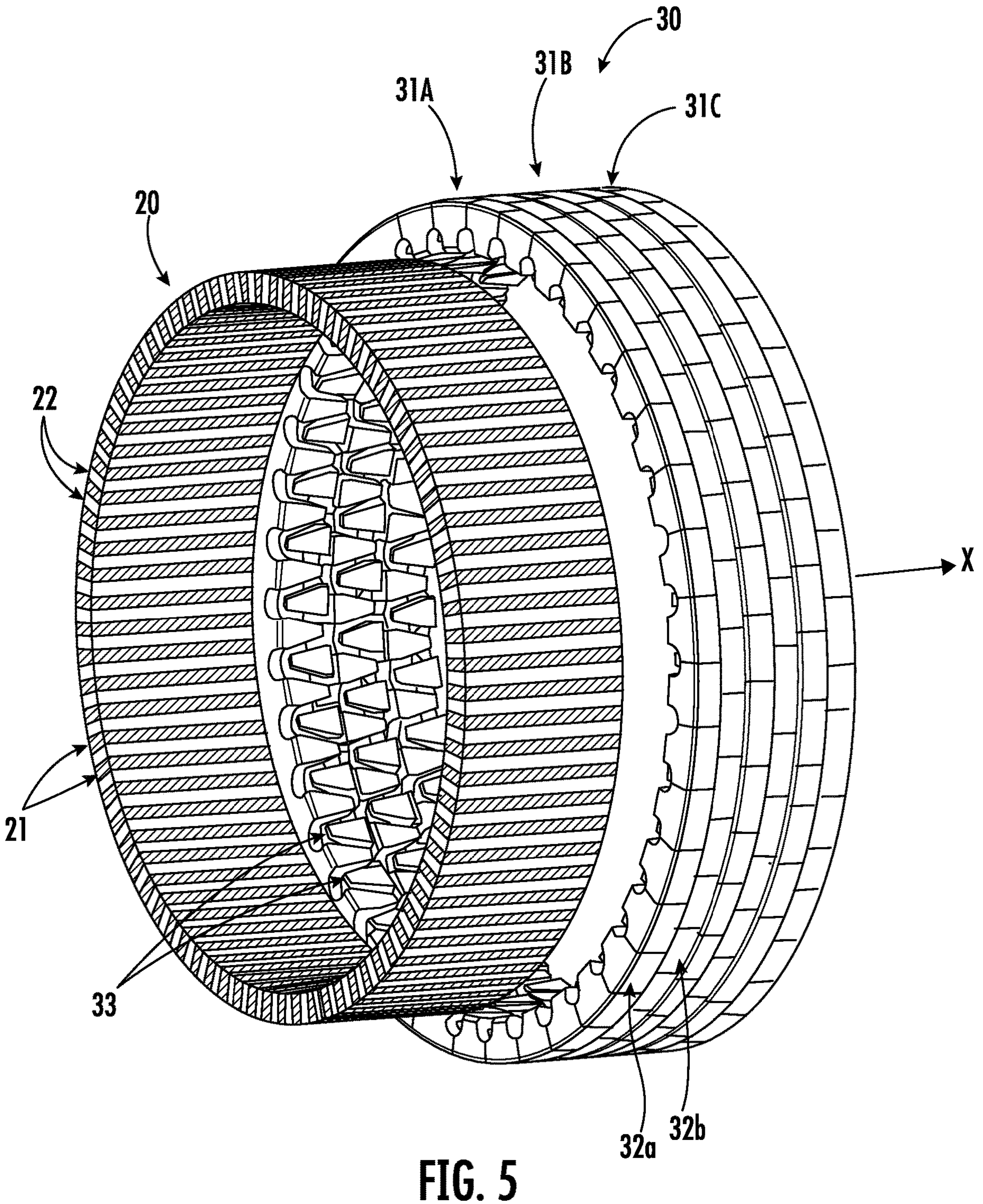
FIG. 5 is an exploded perspective view of the rotor and stator shown in FIG. 4.
Figure 6:
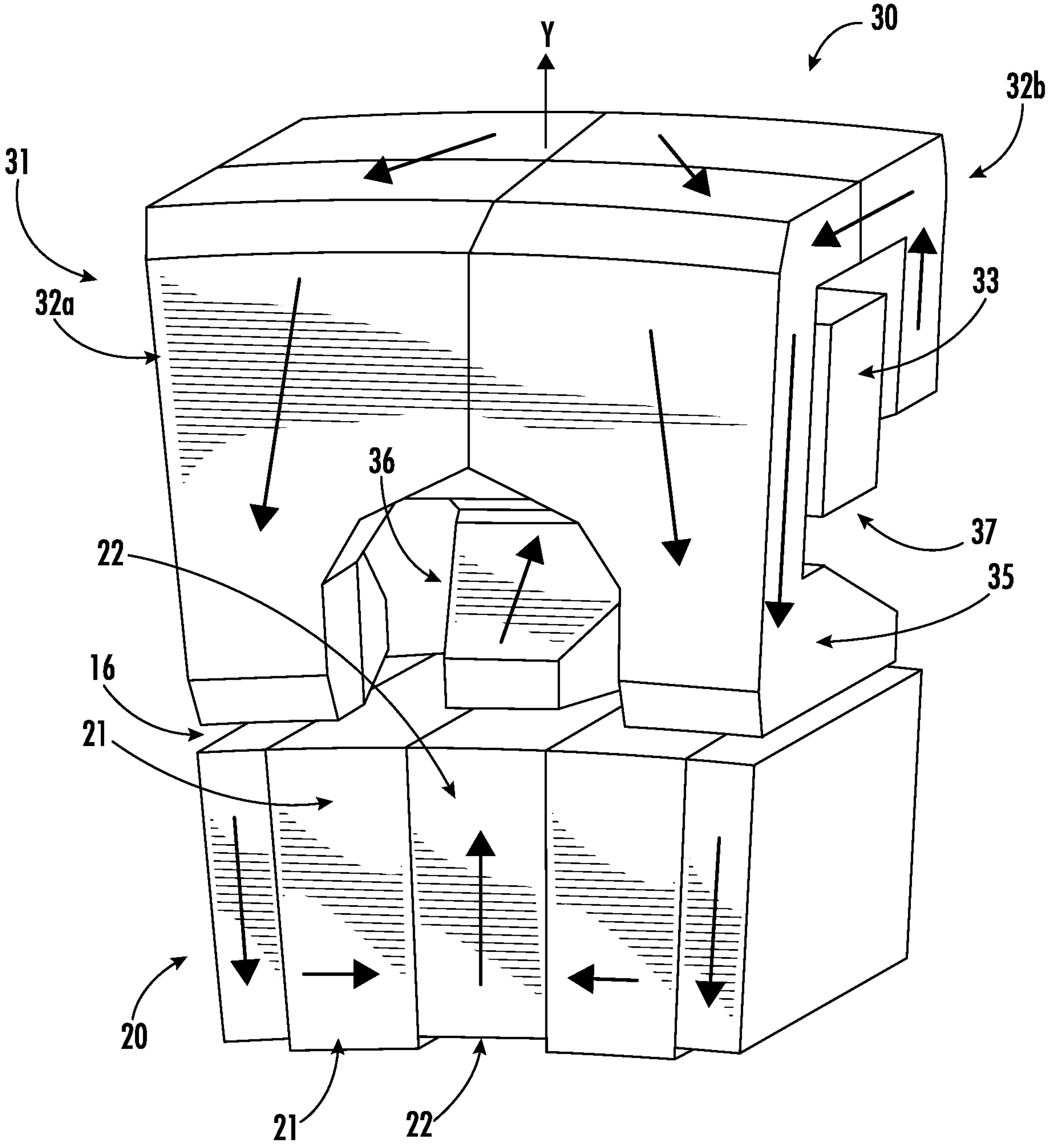
FIG. 6 is an enlarged partial perspective view of the rotor and stator interface shown in FIG. 4.
Figure 7:
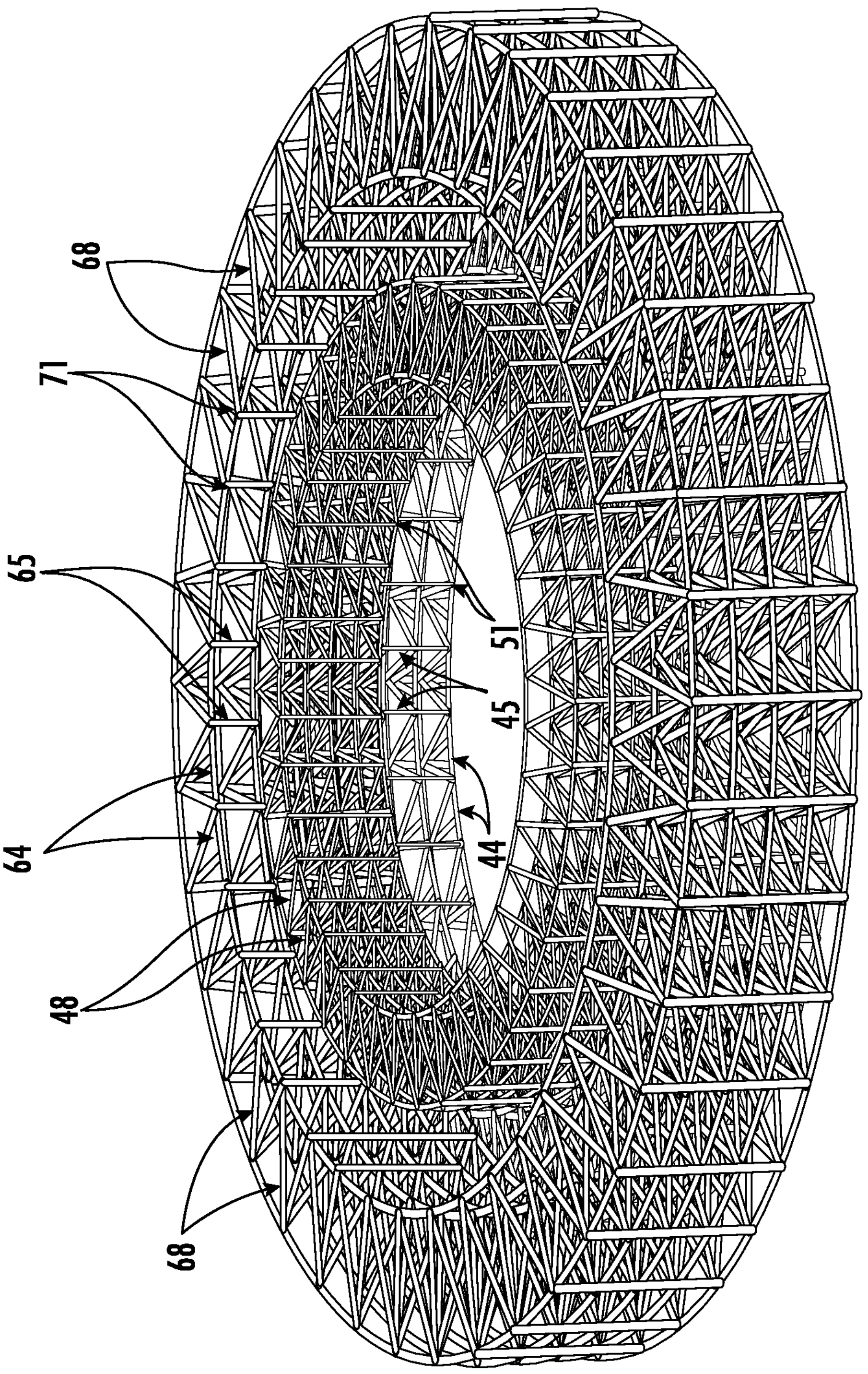
FIG. 7 is a perspective view of the rotor and stator frames shown in FIG. 3.

As shown in FIGS. 4-6, in this embodiment motor 15 is a claw-pole motor. Rotor 20 is connected via rotor frame 40 to output shaft 17 orientated about longitudinal axis x-x. Each of magnets 21 extends axially along longitudinal axis x-x and is positioned radially about axis x-x on the outer circumference of rotor frame 40 to form magnetic poles. Magnets 21 are permanently affixed around the outer circumference of rotor frame 40. The number of magnets may be varied to correspond to the number of stator teeth of stator 30. For example, the number of magnets may be equal to the number of magnetic claw poles/stator teeth 35 and 36 of stator 30. In the embodiment shown in FIGS. 4-6, rotor 20 includes a plurality of flux concentrators 22 between the plurality of magnetic poles 21. In this embodiment, each of flux concentrators 22 and magnetic poles 21 extend axially along longitudinal axis x-x on rotor frame 40 and are positioned radially about axis x-x such that each flux concentrator 22 alternates with each magnetic pole 21 about rotor frame 40. Rotor 20 and rotor frame 40 may together or individually be a monolithic element constructed by an additive manufacturing process. For example, rotor 20 may be made by an additive manufacturing process with magnet and iron powder.

Stator 30 generally comprises annular solenoidal coil 33 within enclosure assembly 31. Annular solenoidal coil 33 comprises a plurality of conductive windings that may be selectively energized. Enclosure assembly 31 includes left portion 32*a* and right portion 32*b*. Left portion 32*a* is a generally annular member having an outer body portion, an extension portion, and a plurality of circumferentially spaced triangular stator teeth 35. Stator teeth 35 form a first plurality of magnetic claw poles. Stator teeth 35 are positioned radially around longitudinal axis x-x and extend axially along longitudinal axis x-x. Right portion 32*b* is a generally annular member having an outer body portion, an extension portion, and a plurality of circumferentially spaced triangular stator teeth 36. Stator teeth 36 form a second plurality of magnetic claw poles. Stator teeth 36 are positioned radially around longitudinal axis x-x and extend axially along longitudinal axis x-x. Thus, left portion 32*a* and right portion 32*b* of enclosure assembly 31 provide a plurality of inner cross-facing, alternating and overlapping stator teeth 35 and 36. Stator teeth 35 and 36 extend axially in opposite directions to each other relative to longitudinal axis x-x. As shown, stator teeth 35 of left portion 32*a* alternate about axis x-x and overlap axially and radially with stator teeth 36 of right portion 32*b* of enclosure assembly 31. Annular stator space 37 is formed axially between the extension portions of left and right portions 32*a* and 32*b* of enclosure 31, respectively, and radially between the outer body portions of left and right portions 32*a* and 32*b* and inner overlapping teeth 35 and 36 of left and right portions 32*a* and 32*b*, respectively, of enclosure assembly 31. Annular solenoid coil 33 is disposed in such annular space 37.

Solenoidal coil 33 thereby extends around longitudinal axis x-x of rotary shaft 17 radially outside of magnets 21 and rotor 20. In an alternative embodiment, a second zig zag solenoid coil may be disposed in the zig-zag space or gap formed between opposed stator teeth 35 and 36 of left and right portions 32*a* and 32*b*, respectively, of enclosure assembly 31 about longitudinal axis x-x of rotary shaft 17. Such zig zag solenoidal coil may thereby also extend around longitudinal axis x-x of rotor 20 radially outside of magnets 21 and rotor 20 but radially inside of solenoid coil 33.

In the embodiment shown in FIGS. 3-6, claw-pole motor 15 has three phases. For a one-phase claw-pole motor, stator teeth 35 of left portion 32*a* and stator teeth 36 of right portion 32*b* of enclosure assembly 31 may be radially asymmetrical to provide a magnetically determined starting position. For a two or more phase claw-pole motor, as shown in FIGS. 1-13, stator teeth 35 of left portion 32*a* and stator teeth 36 of right portion 32*b* of enclosure assembly 31 are radially symmetrical. Left portion 32*a* and right portion 32*b* of enclosure assembly 31 may be manufactured using a powdered metal compaction process in which powdered magnetic material is compacted in a custom die. Other types of powders may be used as alternatives, depending on the application. Enclosure assembly 31 is made with magnetically soft materials. Examples include, without limitation, low carbon steels, silicon steels, iron-cobalt alloys, and molded or additive manufactured (AM) powder iron. Left portion 32*a* and right portion 32*b* of enclosure assembly 31 may each be monolithic elements constructed by an additive manufacturing process or enclosure assembly 31 may be a monolithic enclosure constructed by an additive manufacturing process. Annular solenoidal coil 33 comprises electromagnetic windings that include at least one turn. Solenoidal coil 33 is wound with copper, aluminum wires, ribbons, or any other material suitable for the intended purpose and understood by one of ordinary skill in the art. While annular solenoidal coil 33 is shown with a relatively square cross-section, other embodiments may include an annular solenoidal coil and a zig zag solenoidal coil having a circular or oblong cross-section. FIG. 6 shows the magnetic flux path in which magnetic flux flows across air gap 16 between rotor 20 and stator 30.

Figure 3:
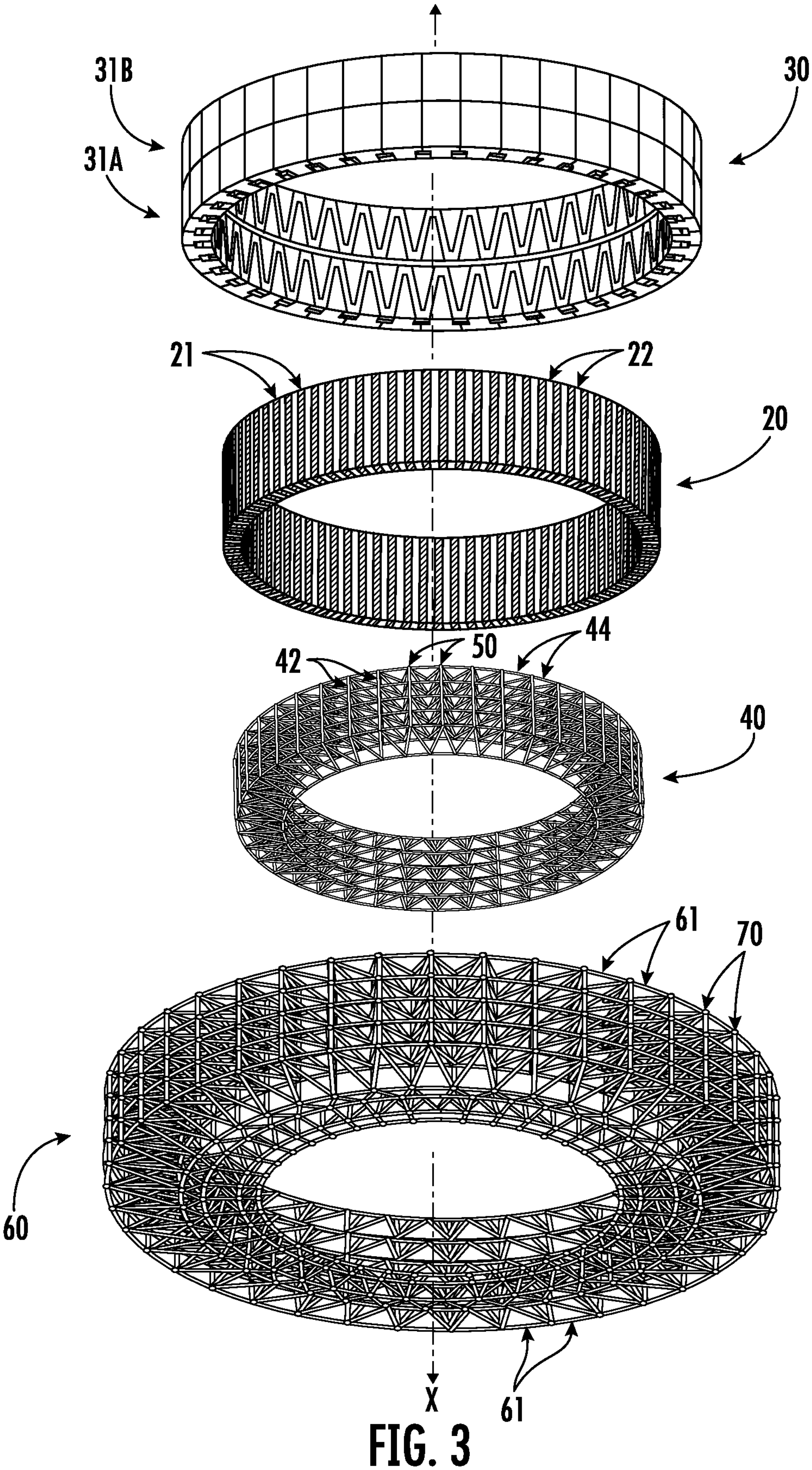
FIG. 3 is a partial exploded perspective view of an embodiment of the motor shown in FIG. 1, showing a two ring or phase rotor and stator assembly.

A series of annular solenoidal coils 33 and enclosure assemblies 31 may be stacked in repeating patterns with an angular shift among motor phases. As shown in the triple stack configuration of FIGS. 4-6, a plurality of stator rings 31A, 31B and 31C are stacked axially to form a multiphase motor. In the embodiment shown in FIGS. 4-6, a three-phase claw-pole motor includes three stator rings 31A, 31B and 31C supported in stator frame 60. Stator rings 31A, 31B and 31C are aligned axially in frame 60. Stator ring 31A and its annular coil are for the first of the three phases, stator ring 31B and its annular coil are for the second of the three phases, and stator ring 31C and its annular coil are for the third of the three phases. Thus, solenoidal coils and enclosure assemblies 31 may be stacked axially in a repeating pattern with an angular shift among the motor phases. In this regard, FIG. 3 shows a two-phase motor having stacked stator rings 31A and 31B, and FIG. 8 shows a redundant four-phase motor having stacked stator rings 31A, 31B, 31C and 31D.

Figure 8:
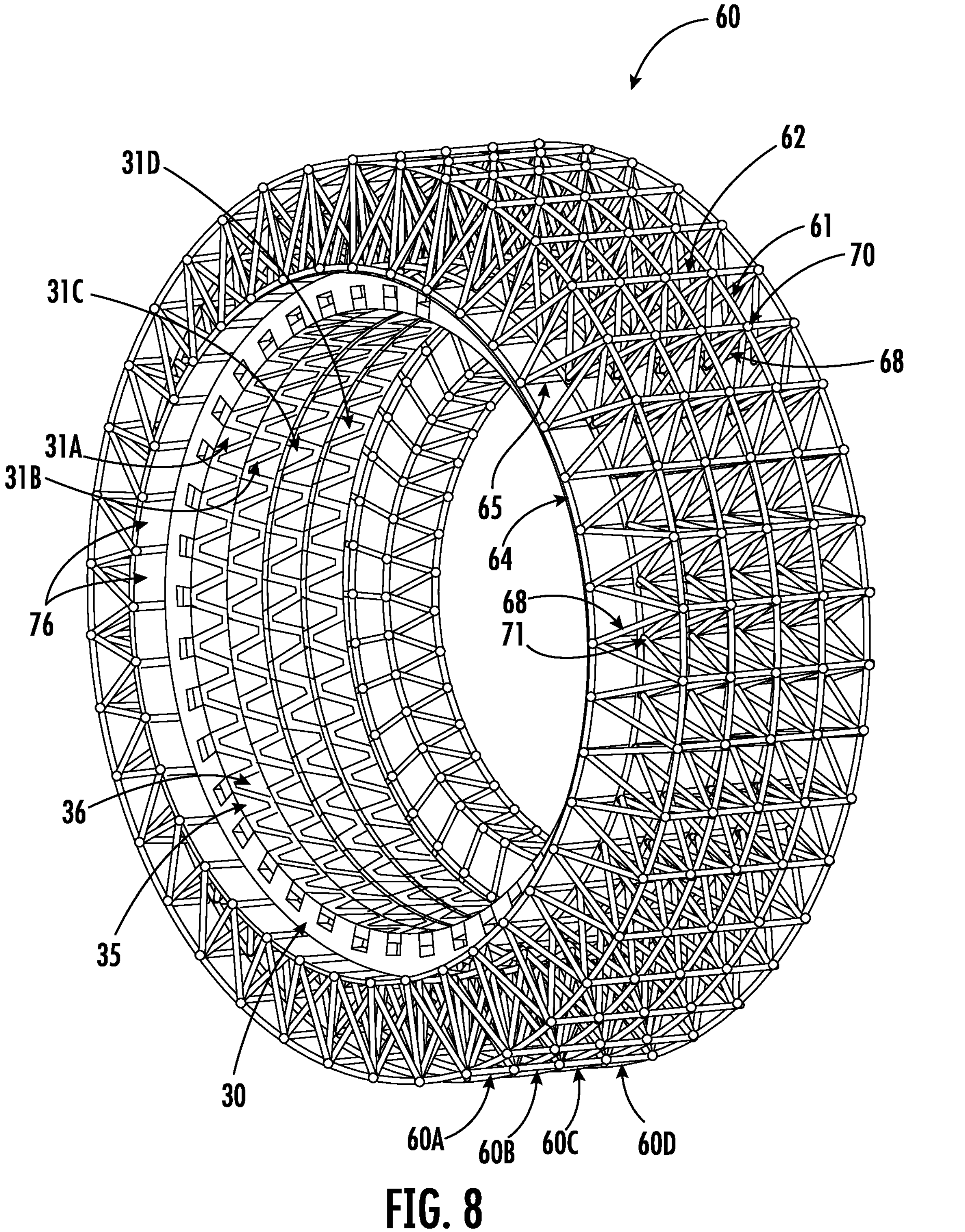
FIG. 8 is a perspective view of an alternate embodiment of the stator and stator frame shown in FIG. 1, showing a four ring or phase stator assembly.
Figure 9:
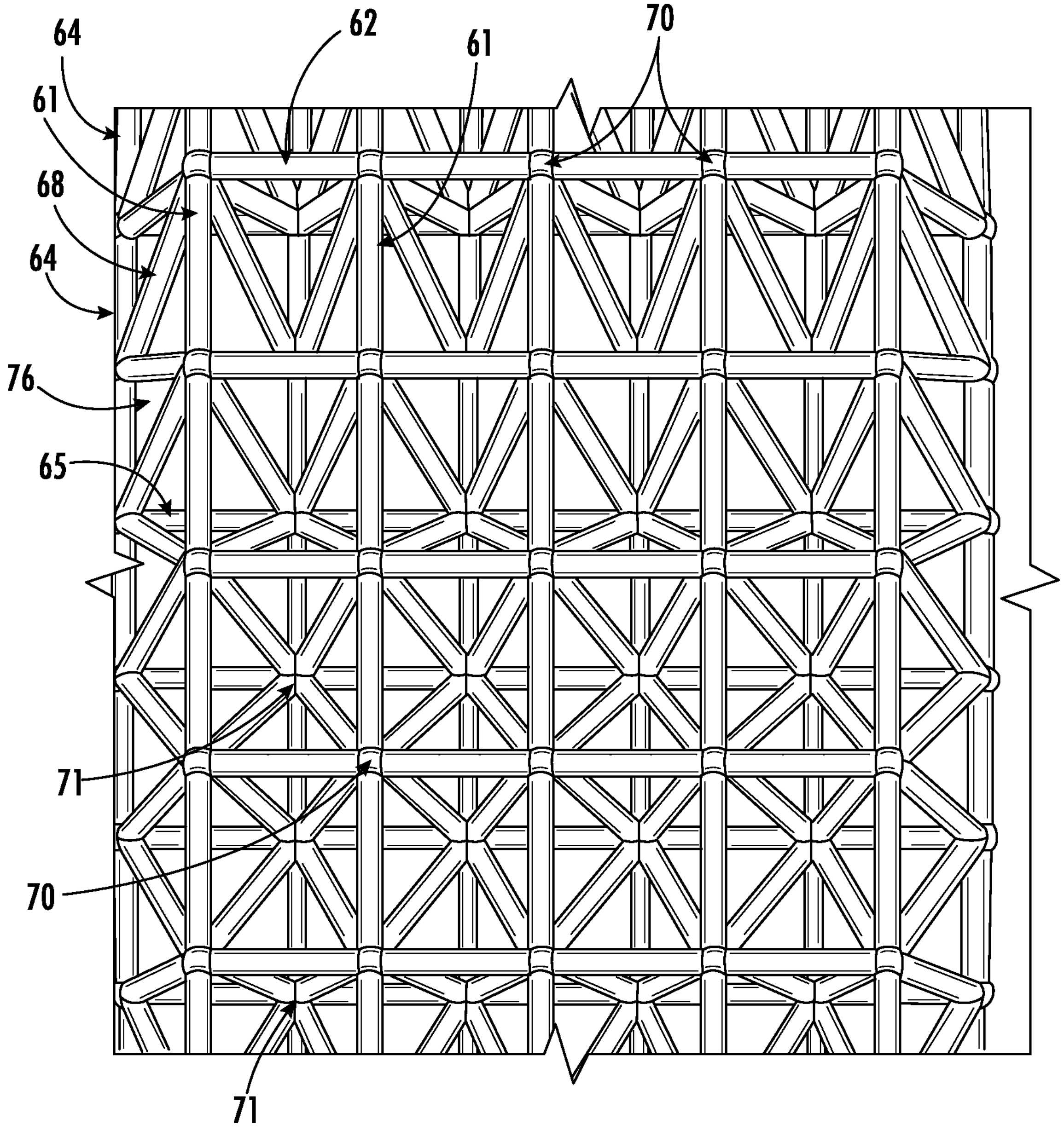
FIG. 9 is an enlarged partial perspective view of the stator frame shown in FIG. 8.
Figure 10:
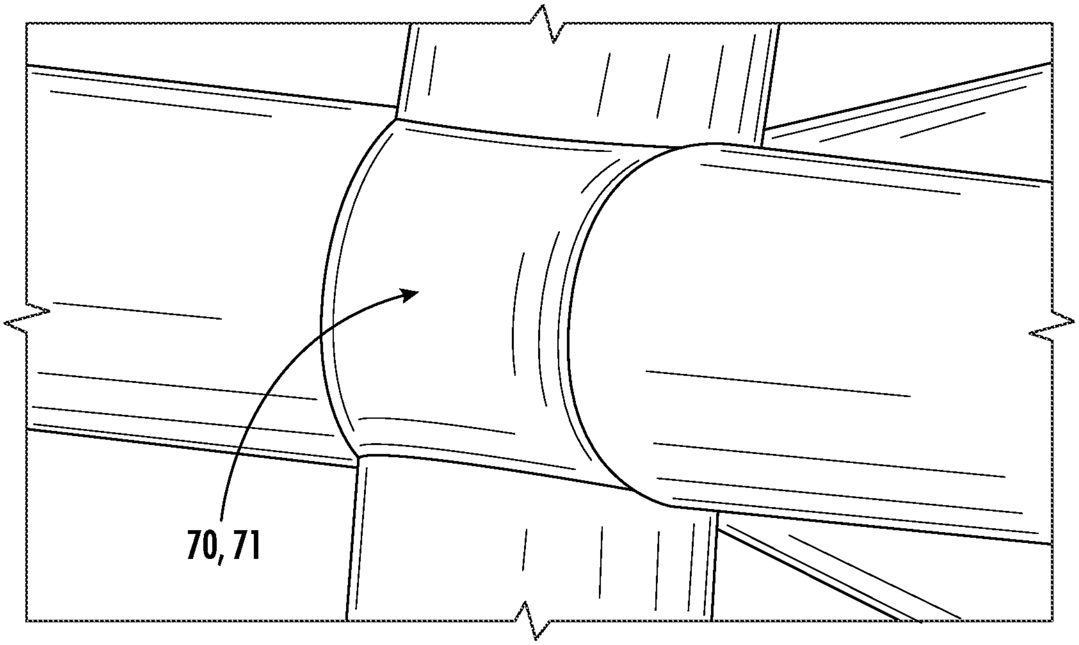
FIG. 10 is an enlarged partial perspective view of a stator frame connection node shown in FIG. 9.

With reference to FIG. 8, each of stator rings 31A, 31B, 31C and 31D is supported by stator support frame rings 60A, 60B, 60C and 60D, respectively. Stator supporting space frame 60 is a specially configured frame formed of a rigid, lightweight, three dimensional truss-like structure constructed from interlocking struts or members connected at nodes in a geometric pattern. As shown, in this embodiment a half-octahedral ring geometry is employed, with four radially extending or diagonal struts 68 from outer nodes 70 and four inner base struts 64 and 65 forming the inner diameter of the rings of stator frame 60 on which stator 30 is supported, and with four radially extending or diagonal struts 68 from inner nodes 71 and four outer base struts 61 and 62 forming the outer diameter of the rings of stator frame 60. A view of a stator-supporting space frame for a two ring stator is shown in FIG. 3 and a view of a stator-supporting space frame for a four ring stator is shown in FIG. 8. However, other space frame structures may be used as alternatives, such as a quadrahedral structure for example.

As shown, stator frame 60 has a three dimensional annular open structural framework orientated in a geometric pattern and is formed by a plurality of stator frame inner members 64 and 65, a plurality of stator frame outer members 61 and 62, and a plurality of stator frame cross members 68 interconnected at a plurality of inner stator frame nodes 71 and outer stator frame nodes 70. The stator frame inner members comprise a plurality of axially extending members 65 and a plurality of circumferentially or laterally extending members 64 interconnected at a plurality of inner nodes 71. The stator frame outer members comprise a plurality of axially extending members 62 and a plurality of circumferentially or laterally extending members 61 interconnected at a plurality of outer nodes 70. The stator frame cross members comprise a plurality of radial and diagonally extending members 68 interconnected to stator frame inner members 64 and 65 at inner nodes 71 and interconnected to stator frame outer members 61 and 62 at outer nodes 70, respectively. The struts or members of the stator space frame 60 may be aluminum, steel, titanium, carbon fiber composite, or other metal or composite material, and, in this embodiment, are hollow in order to transmit coolant fluid for cooling the motor. In this embodiment, such passages have a circular cross-section, but other cross-sectional profiles may be used as alternatives such as a rectangular profile for example. The struts or members may all have the same length or may be varied in length. Stator frame 60 may also be formed from an additive manufacturing or 3D printing process.

Figure 11:
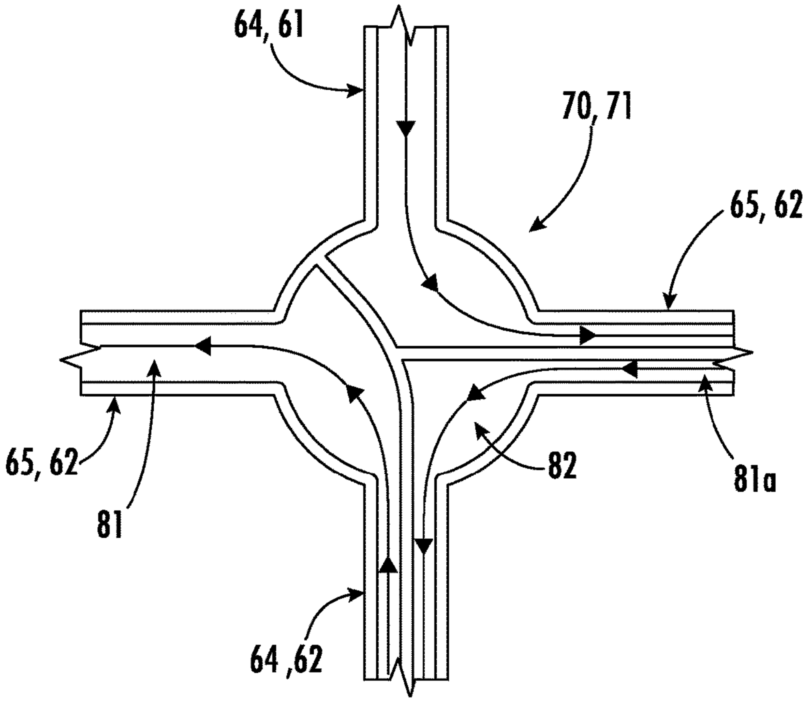
FIG. 11 is a schematic view of an embodiment of an interior flow junction of the frame connection node shown in FIG. 10.
Figure 12A:
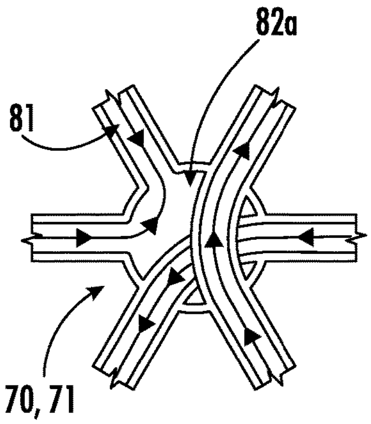
FIG. 12A is a schematic view of a first alternative embodiment of the interior flow junction shown in FIG. 11.
Figure 12B:
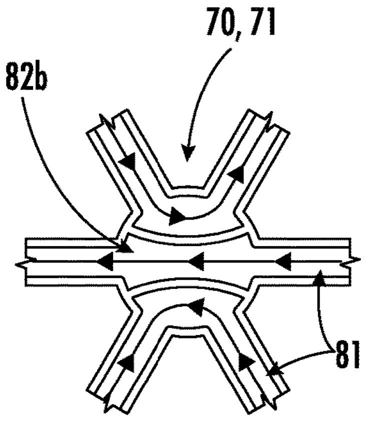
FIG. 12B is a schematic view of a second alternative embodiment of the interior flow junction shown in FIG. 11.
Figure 12C:
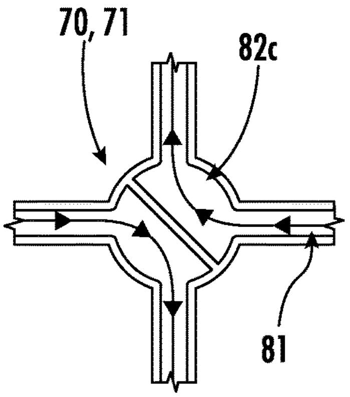
FIG. 12C is a schematic view of a third alternative embodiment of the interior flow junction shown in FIG. 11.
Figure 13:
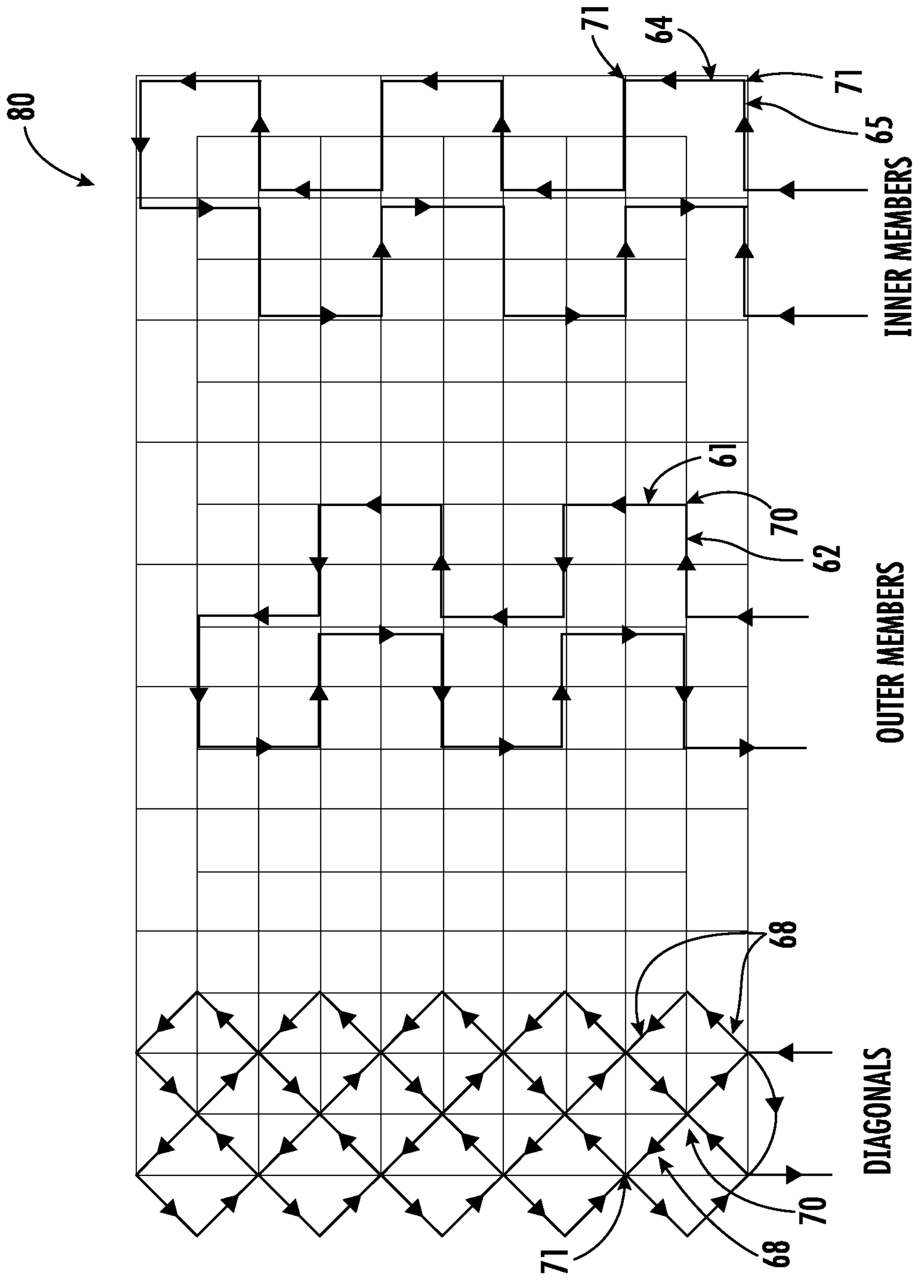
FIG. 13 is a schematic view of embodiment flow paths through the stator frame shown in FIG. 9.

As shown in FIGS. 11-13, stator frame inner members 64 and 65, stator frame outer members 61 and 62 and stator frame cross members 68 are hollow tubular members having interior channels or flow passages 81, 81*a*. As shown, flow passages 81*a* are configured as dual channel passages. Stator frame nodes 70 and 71 are also hollow and have interior flow junctions 80, 80*a*, 80*b* or 80*c* connecting member flow passages 81, 81*a* in different configurations as desired. Thus, member flow passages 81 and 81*a* and node flow junctions 80, 80*a*, 80*b* or 80*c* are connected to form stator frame fluid circuit 80 for cooling motor 15. Alternative flow junction configurations 82, 82*a*, 82*b* and 82*c* interior to nodes 70 and 71 are shown in FIGS. 11, 12A, 12B and 12C, the use of which depends on the node connection location, the member location and the desired flow path 80. Interior coolant flow path 80 is thereby provided and the configuration of coolant passage path 80 through the interior of the members of frame 60 may be varied as desired.

Annular manifold 85 is provided at one axial end of stator frame 60 for distributing coolant to flow passages 81, 81*a* of cooling circuit 80. Manifold 85 is a hollow annular vessel having inlet port 86 and outlet port 87 at one annular end, an interior volume, and a plurality of in fluid connection with passages 81, 81*a* in frame 60 to distribute coolant flow though passages 81 and junctions 82 of coolant circuit 80 at a threshold operating temperature gradient.

As shown, flow passages 81 and flow junctions 82 are arranged three dimensionally in a predetermined configuration so as to provide the desired coolant circuit 80. Thus, flow passages 81 weave through stator frame 60. Coolant is supplied via one or more circulation pumps and inlet 86 into manifold 85. Coolant is then directed through a plurality of openings in manifold 85 so as to disperse the coolant through passages 81 of lateral, axial and diagonal frame members 61, 62, 64, 65 and 68 such that it is directed to flow around the outside of stator 30, thereby cooling motor 15. Coolant then exits flow circuit 80 into manifold 85, where the coolant is then directed out through outlet 87. Accordingly, coolant circuit 80 receives coolant through inlet 86 and discharges coolant though outlet 87. Interior coolant flow path 80 extends between inlet 86 and outlet 87 within interior passages 81 and junctions 82.

Figure 2:
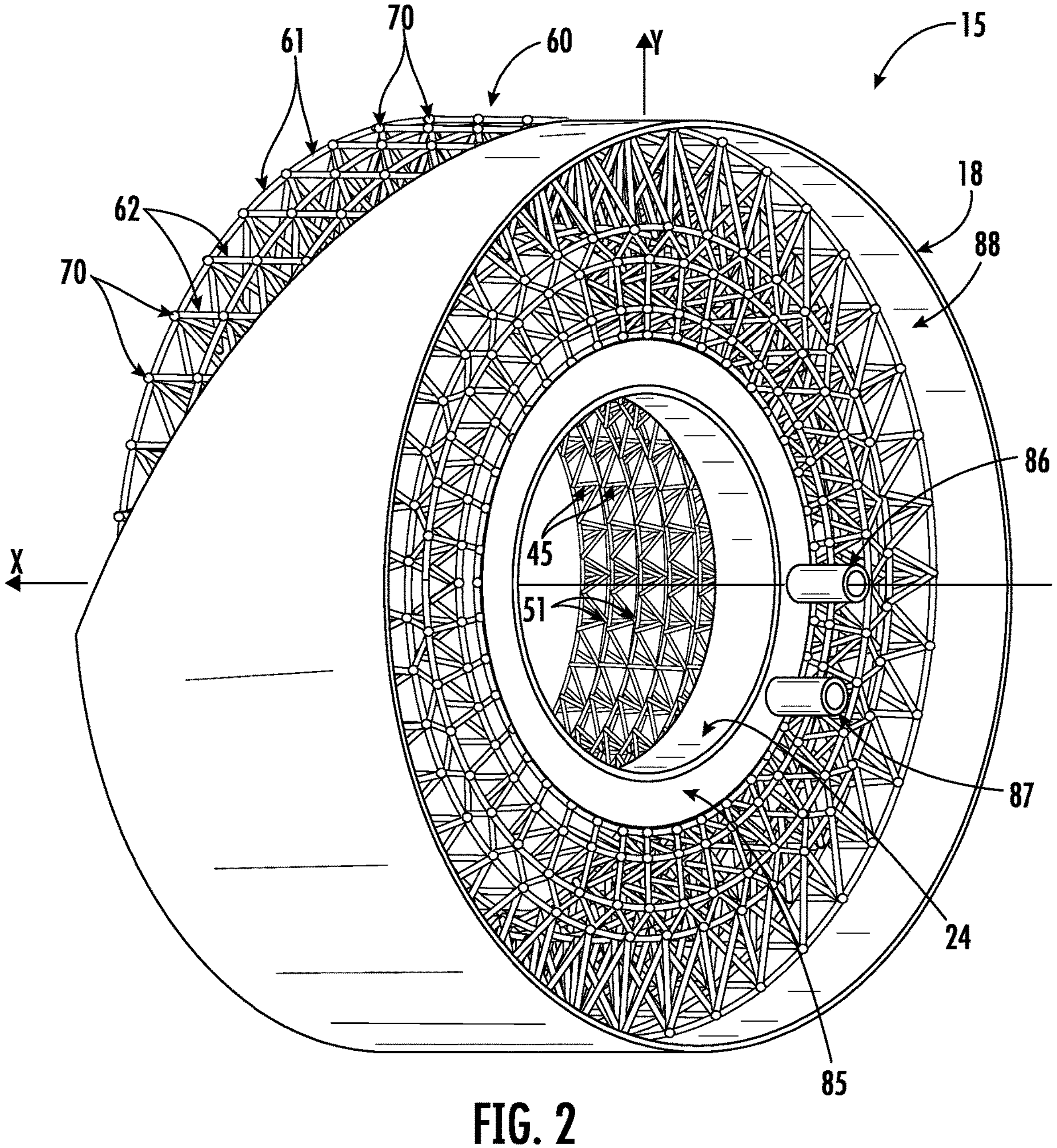
FIG. 2 is a right partial cutaway perspective view of the motor shown in FIG. 1.

As shown in FIG. 2, manifold 85 is supported by outer annular manifold frame 88, which extends axially from stator frame 60. Similar to outer stator-supporting frame 60, manifold supporting space frame 88 is a specially configured frame formed of a rigid, lightweight, three dimensional truss-like structure constructed from interlocking struts or members connected at nodes in a geometric pattern. Manifold frame 88 is supported by stator frame 60 frame and is stacked axially behind stator frame 60 with reference to FIG. 1.

As shown in FIG. 1, shaft 17 of motor 15 is fixed to and extends from the left annular edge of rotor frame 40. Shaft 17 may include outer shaft adapter 74, which extends radially from shaft 17. Similar to outer stator-supporting frame 60, shaft adapter 74 is a specially configured frame formed of a rigid, lightweight, three dimensional truss-like structure constructed from interlocking struts or members connected at nodes in a geometric pattern. Shaft adapter 74 is stacked axially in front of and radially overlaps stator frame 60, rotor frame 40, rotor 20 and stator 30 with reference to FIG. 1.

In the embodiment shown in FIG. 1, rotor frame 40, rotor 20, stator 30, stator frame 60, shaft 17, shaft adapter 74, manifold 85, bearing 24 and manifold frame 88 are housed within outer cylindrical shell 18. Shell 18, rotor frame 40, rotor 20, stator 30, stator frame 60, shaft 17, shaft adapter 74, manifold 85, bearing 24 and manifold frame 88 are concentric and each is orientated coaxially about center axis x-x. In certain embodiments, shell 18 may comprise an airframe structure.

As shown in FIG. 8, stiffening panels or plates 76 may be added to seal the interior of stator frame 60. Plates 76 extend between inner axial and lateral base struts 64 and 65 that form the inner diameter of the rings of stator frame 60.

Similar to outer stator-supporting frame 60, rotor supporting space frame 40 is a specially configured frame formed of a rigid, lightweight, three dimensional truss-like structure constructed from interlocking struts or members connected at nodes in a geometric pattern. As shown, in this embodiment a half-octahedral ring geometry is employed, with four radially extending or diagonal struts 48 from inner nodes 51 and four outer base struts 41 and 42 forming the outer diameter of the rings of rotor frame 40 on which rotor 20 is supported, and with four radially extending or diagonal struts 48 from outer nodes 50 and four inner base struts 44 and 45 forming the inner diameter of the rings of rotor frame 40. A view of a rotor-supporting space frame for a two ring stator is shown in FIG. 3 and a view of a rotor-supporting space frame for a three ring stator is shown in FIG. 1. Sleeve bearing 24 is provided between the inner diameter of manifold 87 and the rotor frame 40.

As shown, rotor frame 40 has a three dimensional annular open structural framework orientated in a geometric pattern and is formed by a plurality of rotor frame inner members 44 and 45, a plurality of rotor frame outer members 41 and 42, and a plurality of rotor frame cross members 48 interconnected at a plurality of inner rotor frame nodes 51 and outer rotor frame nodes 50. The rotor frame inner members comprise a plurality of axially extending members 45 and a plurality of circumferentially or laterally extending members 44 interconnected at a plurality of inner nodes 51. The rotor frame outer members comprise a plurality of axially extending members 42 and a plurality of circumferentially or laterally extending members 41 interconnected at a plurality of outer nodes 50. The rotor frame cross members comprise a plurality of radial and diagonally extending members 48 interconnected to rotor frame inner members 44 and 45 at inner nodes 51 and interconnected to rotor frame outer members 41 and 42 at outer nodes 50, respectively. The struts or members of the rotor space frame 40 may be aluminum or steel and may all have the same length or may be varied in length. Rotor frame 40 may also be formed from an additive manufacturing or 3D printing process.

As is conventional in a rotary magnetic motor, rotor 20 is driven to rotate relative to stator 30. Rotor 20 is at least partially surrounded by stator 30 and rotor 20 generates a magnetic field by virtue of built in permanent magnets 21. Stator 30 generates magnetic fields through coils or windings 33. Stator coils 33 generate magnetic flux that interacts with permanent magnets 21 of rotor 20 and the interaction of magnetic forces from rotor 20 and from stator 30 will rotate rotor 20 and shaft 17 about motor axis x-x. When windings 33 of stator 30 are energized, a magnetic field is formed that interacts with the magnetic field of permanent magnets 21 of rotor 20 in a manner such that torque, and subsequent rotation, is produced in rotor 20. Radial air gap 16 is provided between the outer surface of rotor 20 and the inner surface of stator 30. Normally stator 30 is stationary and drives rotor 20. However, it is possible to make the rotor stationary and have the stator drive itself relative to the rotor. Thus, rotary motor 15 includes generally cylindrical outer stator core 31 supported by stator frame 60, stator windings 33 wound within stator core 31, and inner rotor 20 having permanent magnets 21 and supported on rotor frame 40 and that rotates about center axis x-x relative to stator core 31 so as to provide rotary motion by means of interaction with the magnetic field of stator 30. In the embodiments shown, the electric motor has either a 2-ring, 3-ring or 4-ring claw pole stator supported in stator space frame 60. However, other motor stator configurations may be used as alternatives. Other types of motors may also be used as alternatives, including without limitation other inrunner brushless motors such as slotted motors.

The improved motor assembly has a number of benefits. For example, an external heat exchanger can be eliminated, the weight of the housing structure is greatly reduced, and bearings can be integrated into the structure. In addition, the frames provide stiffening for the stator and rotor, respectively. Convection cooling can be provided through the interior cooling passages of the frame members and conduction cooling can be provided to the outside of the frame members through the open space between the individual members forming the open lattice work of the frame.

The present disclosure contemplates that many changes and modifications may be made. Therefore, while forms of the improved motor assembly have been shown and described, and a number of alternatives discussed, persons skilled in this art will readily appreciate that various additional changes and modifications may be made without departing from the scope of the invention, as defined and differentiated by the following claims.

What is claimed is:

1. A motor comprising:
a stator having electrical windings;
a stator frame supporting said stator;
a rotor having permanent magnets;
a rotor frame supporting said rotor;
said rotor orientated about a longitudinal axis and mounted for movement about said longitudinal axis relative to said stator;
a radial air gap between said stator and said rotor;
said stator frame comprising a three dimensional annular open structural framework orientated in a geometric pattern comprising a plurality of stator frame inner members, stator frame outer members and stator frame cross members interconnected at a plurality of stator frame nodes;
said stator frame inner members comprising a plurality of axially extending members and a plurality of circumferentially extending members interconnected at a plurality of inner nodes;
said stator frame outer members comprising a plurality of axially extending members and a plurality of circumferentially extending members interconnected at a plurality of outer nodes; and
said rotor frame comprising a three dimensional annular open structural framework orientated in a geometric pattern comprising a plurality of rotor frame inner members, rotor frame outer members and rotor frame cross members interconnected at a plurality of rotor frame nodes.

2. The motor of claim 1, wherein said stator frame cross members comprise a plurality of radial and diagonally extending members interconnected to said stator frame inner members at said plurality of inner nodes and interconnected to said stator frame outer members at said plurality of outer nodes.

3. The motor of claim 2, wherein said stator frame circumferentially extending members and said stator frame cross members define a triangular geometric pattern.

4. The motor of claim 2, wherein said stator frame inner members, stator frame outer members and stator frame cross members define a tetrahedral geometric ring pattern or a half-octahedral geometric ring pattern.

5. The motor of claim 1, wherein:
said rotor frame inner members comprise a plurality of axially extending members and a plurality of circumferentially extending members interconnected at a plurality of inner nodes;
said rotor frame outer members comprise a plurality of axially extending members and a plurality of circumferentially extending members interconnected at a plurality of outer nodes;
and said rotor frame cross members comprise a plurality of radial and diagonally extending members interconnected to said rotor frame inner members at said plurality of inner nodes and interconnected to said rotor frame outer members at said plurality of outer nodes.

6. The motor of claim 5, wherein said rotor frame circumferentially extending members and said rotor frame cross members define a triangular geometric pattern.

7. The motor of claim 5, wherein said rotor frame inner members, rotor frame outer members and rotor frame cross members define a tetrahedral geometric ring pattern or a half-octahedral geometric ring pattern.

8. The motor of claim 1, comprising an outer stator frame shell.

9. The motor of claim 1, wherein:
said stator comprises a first stator portion having a plurality of first stator teeth orientated radially about said longitudinal axis and extending axially in a first direction and a second stator portion having a plurality of second stator teeth orientated radially about said longitudinal axis and extending axially in a second direction opposite to said first direction;
said first stator portion and said second stator portion defining a first stator gap orientated about said longitudinal axis and extending axially between said first stator portion and said second stator portion and about said longitudinal axis;
at least a portion of the plurality of first stator teeth extending axially in the first direction beyond at least a portion of the plurality of second stator teeth that extend axially in the second direction, to form a second stator gap orientated about said longitudinal axis and extending both axially and radially between said plurality of first stator teeth of said first stator portion and said plurality of second stator teeth of said second stator portion and about said longitudinal axis; and
said electrical windings comprise first electromagnetic windings disposed in said first gap between said first stator portion and said second stator portion and configured to be selectively energized to exert a torque on said rotor.

10. A motor comprising:
a stator having electrical windings;
a stator frame supporting said stator;
a rotor having permanent magnets;
a rotor frame supporting said rotor;
said rotor orientated about a longitudinal axis and mounted for movement about said longitudinal axis relative to said stator;
a radial air gap between said stator and said rotor;
said stator frame comprising a three dimensional annular open structural framework orientated in a geometric pattern comprising a plurality of stator frame inner members, stator frame outer members and stator frame cross members interconnected at a plurality of stator frame nodes;
said rotor frame comprising a three dimensional annular open structural framework orientated in a geometric pattern comprising a plurality of rotor frame inner members, rotor frame outer members and rotor frame cross members interconnected at a plurality of rotor frame nodes;
said stator frame inner members, stator frame outer members and stator frame cross members comprising interior stator frame member flow passages;
said stator frame nodes comprising interior stator frame node flow junctions; and
said stator frame member flow passages and said stator frame node flow junctions connected to form a stator frame fluid passage for cooling said stator.

11. The motor of claim 10, comprising a stator fluid inlet communicating with said stator frame fluid passage and a stator fluid outlet communicating with said stator frame fluid passage.

12. The motor of claim 11, comprising a stator fluid manifold communicating with said stator frame fluid passage, said stator fluid inlet and said stator frame fluid outlet.

13. The motor of claim 12, comprising a bearing between said stator fluid manifold and said rotor frame.

* * * * *